(12) United States Patent
Tennie et al.

(10) Patent No.: US 10,015,253 B2
(45) Date of Patent: Jul. 3, 2018

(54) SYSTEM AND METHOD FOR PREEMPTIVE REQUEST PROCESSING

(71) Applicant: SAP SE, Walldorf (DE)

(72) Inventors: Olaf Tennie, Heidelberg (DE); Tatjana Pfeifer, Altrip (DE); Matthias Tebbe, Walldorf (DE)

(73) Assignee: SAP SE, Walldorf (DE)

( * ) Notice: Subject to any disclaimer, the term of this patent is extended or adjusted under 35 U.S.C. 154(b) by 326 days.

(21) Appl. No.: 14/964,982

(22) Filed: Dec. 10, 2015

(65) Prior Publication Data

US 2017/0171311 A1    Jun. 15, 2017

(51) Int. Cl.
G06F 15/167 (2006.01)
H04L 29/08 (2006.01)
H04L 29/06 (2006.01)

(52) U.S. Cl.
CPC ...... H04L 67/1097 (2013.01); H04L 67/2842 (2013.01); H04L 67/42 (2013.01)

(58) Field of Classification Search
CPC .. H04L 67/1097; H04L 67/2842; H04L 67/42
See application file for complete search history.

(56) References Cited

U.S. PATENT DOCUMENTS

| | | | | |
|---|---|---|---|---|
| 8,112,505 B1* | 2/2012 | Ben-Shaul | ........ | G06F 17/30168 709/217 |
| 9,384,227 B1* | 7/2016 | Xiao | .................. | G06F 17/30584 |
| 9,798,468 B2* | 10/2017 | Sivasubramanian | ... | G06F 3/061 |
| 9,798,528 B2* | 10/2017 | Gao | ....................... | G06F 8/4442 |
| 2002/0087883 A1* | 7/2002 | Wohlgemuth | ............ | G06F 8/65 726/29 |
| 2002/0120741 A1* | 8/2002 | Webb | .................. | G06F 11/3093 709/225 |
| 2004/0230753 A1* | 11/2004 | Amiri | ................... | G06F 9/5016 711/147 |
| 2012/0004997 A1* | 1/2012 | Ramer | ............. | G06F 17/30905 705/14.46 |

(Continued)

OTHER PUBLICATIONS

Internet article from Wikipedia, "Representational State Transfer," last modified on Dec. 9, 2015.

(Continued)

*Primary Examiner* — Davoud Zand
(74) *Attorney, Agent, or Firm* — Fountainhead Law Group P.C.

(57) ABSTRACT

Embodiments described herein relate to an improved technique for preemptive client application request processing based on observed use access patterns and/or models. The system includes a framework engine operable to trace sequences of requests to one or more service provider applications, including which particular client requests are likely to be followed by other particular client requests for each service. Based on the resulting traces, the framework can determine the probability of a particular request B following another particular request A. When request A is retrieved from the service provider application, and when the probability is high enough (e.g. >50%) that request B will follow request A in the sequence of requests, the framework is operable to simulate request B in a background process and provide a response to request B from a local memory storage.

15 Claims, 6 Drawing Sheets

(56) References Cited

U.S. PATENT DOCUMENTS

| | | | |
|---|---|---|---|
| 2013/0268655 A1* | 10/2013 | Luna | H04L 43/10 |
| | | | 709/224 |
| 2013/0311594 A1* | 11/2013 | Luna | H04L 43/065 |
| | | | 709/213 |
| 2014/0081652 A1* | 3/2014 | Klindworth | G06Q 10/10 |
| | | | 705/2 |
| 2015/0256641 A1* | 9/2015 | Agarwal | H04L 67/2847 |
| | | | 709/203 |

OTHER PUBLICATIONS

Internet article from Wikipedia, "Open Data Protocol," last modified on Dec. 5, 2015.

* cited by examiner

SYSTEM AND METHOD FOR PREEMPTIVE REQUEST PROCESSING

TECHNICAL FIELD

At least certain embodiments disclosed herein relate generally to data processing in a computer network, and more particularly to predictive request processing and data caching operations.

BACKGROUND

A framework offers access to application data via application specific services based on a well-defined protocol, such as for example the Open Data Protocol (OData). OData is an OASIS (Organization for the Advancement of Structured Information Standards) standard well-defined network communication protocol that defines practices for building and consuming of queryable and interoperable "RESTful" (Representation State Transfer-ful) Application Programming Interfaces (APIs). The ODATA protocol defines request and response headers, status codes, HTTP methods, URL conventions, media types, payload formats, and query options, etc. OData metadata comprises a machine-readable description of the data model for APIs, which enables the creation of various generic client proxies and tools.

SUMMARY

The embodiments described herein include techniques for preemptive application request processing based on use access patterns and modeling. In one embodiment, a method for processing client application requests in a communication network is disclosed. The method comprises tracing sequences of client application requests for data from service provider applications to identify which requests have a probability above a threshold probability of following other requests, collecting statistical data based on the sequences of client application requests, generating preemptive processing rules based on the statistical data, receiving a first request from the client application for first application data of the service provider application, and determining whether the first request is associated with a preemptive processing rule.

If the first request is associated with a preemptive processing rule, the method further comprises delegating the first request to the service provider application, contemporaneously delegating to a background process a second request that is predicted to follow the first request, and providing a first response to the first request comprising the first application data received from the service provider application. In one embodiment, the background process is configured to simulate the second request and retrieve the data corresponding to the second request from data storage of the service provider application in anticipation of receiving the second request from the client application. The data of the simulated second request can be provided by the service provider application and stored in a data cache.

The method further comprises receiving the second request from the client application for second application data of the service provider application and providing a second response to the second request comprising the second application data from the data cache instead of from the service provider application data storage. The second response can be provided from the data cache without having to delegate the second request from the client application to the service provider application, and without the service provider having to calculate a response at that time.

The statistical data can be based upon observed use access patterns of the client application. Alternatively, the statistical data is based on a use access model for the client application.

In another embodiment, a system for processing client application requests in a communication network is disclosed. The system comprises a framework engine operable to receive client application requests for data, to provide responses from one or more service provider applications, and to generate statistical data from the client application requests. The system further includes a preemptive cache manager coupled with a data cache and operable to communicate with the framework engine, and a preemptive rules generator operable to analyze the statistical data and to generate one or more preemptive processing rules that identify which requests have a probability above a threshold probability of following other requests.

When the threshold probability (which can be configurable) is exceeded for a particular set of client application requests, responses to the client application requests can be provided from the data cache instead of from the one or more service application providers without having to delegate the second request to the service provider application. The statistical data can be based upon observed use access patterns of the client application or based on a use access model developed for the client application. The system further includes a modeling unit operable to facilitate generating the use access models to simulate use access patterns of client applications.

In yet other embodiments, a computer readable medium operable to perform operations for processing client application requests in a communication network is disclosed. The operations comprise tracing sequences of client application requests for data from service provider applications to identify which requests have a probability above a threshold probability of following other requests, collecting statistical data based on the sequences of client application requests, generating one or more preemptive processing rules based on the statistical data, receiving a first request from the client application for first application data of the service provider application, and determining whether the first request is associated with a preemptive processing rule.

If the first request is associated with a preemptive processing rule, the operations further comprise delegating the first request to the service provider application, contemporaneously delegating to a background process a second request that is predicted to follow the first request, and providing a first response to the first request comprising the first application data received from the service provider application. In one embodiment, the background process is configured to simulate the predicted second request and retrieve the data corresponding to the second request from data storage of the service provider application in anticipation of receiving the second request from the client application. The data of the simulated second request can be provided by the service provider application and stored in a data cache.

The operations further comprise receiving the second request from the client application for second application data of the service provider application and providing a second response to the second request comprising the second application data from the data cache instead of from the service provider application. The second response can be provided from the data cache without having to delegate the second request to the service provider application.

The following detailed description and accompanying drawings provide a better understanding of the nature and advantages of the present invention.

BRIEF DESCRIPTION OF THE DRAWINGS

For a better understanding of at least certain embodiments, reference will be made to the following detailed description, which is to be read in conjunction with the accompanying drawings.

DETAILED DESCRIPTION

Throughout the description, for the purposes of explanation, numerous specific details are set forth in order to provide a thorough understanding of the present invention. It will be apparent to one skilled in the art, however, that the techniques described herein may be practiced without some of these specific details. In other instances, well-known structures and devices may be shown in block diagram form to avoid obscuring the underlying principles of the invention.

The embodiments described herein relate to an improved system and method for providing preemptive client application request processing over a communications network. Online applications running on client systems, such as mobile devices, typically consume data via a well-defined protocol (e.g., ODATA). Applications attempt to display various screens requested by a user as fast as possible. To achieve this, usually only a restricted amount of data is requested by the user interface (UI). After user navigation, the client application typically needs to load the missing information.

In many instances, the data required for a subsequent operation can be predicted. A service running on a specific system can only be consumed by a limited number of UI applications, and a limited number of users. This together with a well-defined protocol comprising a set of allowed requests per service will result in service usage patterns that occur with a certain likelihood.

In a first alternate embodiment, the framework designed according to the techniques described herein is operable to trace sequences of client application requests to one or more service provider applications, including which particular client requests are likely to be followed by other particular client requests for each service (and optionally by additional parameters such user name or the name of the client application). Based on the resulting traces, the framework can determine the probability of a particular request "B" following another particular request "A". When request A is retrieved from the service provider application and when the probability is high enough (e.g. >50%) that request B will follow request A in the sequence of requests, the framework is operable to (1) delegate request A to the provider application and return the response of request A to the client application, (2) contemporaneously simulate request B, and (3) delegate the simulated request B to the service provider application in a background process.

In one embodiment, the background process is configured to simulate the second request and retrieve the data corresponding to the second request from data storage of the service provider application in anticipation of receiving the second request from the client application. The data of the simulated second request can be provided by the service provider application and stored in a data cache for later retrieval. In addition, it should be noted that the background process can run in the context of the user that has triggered request A to mitigate any security risk because the authorization checks can already be executed for that particular user.

The result of the simulated request B can then be stored in a local data storage location (e.g., in a data cache). If request B is subsequently received from the client application, the framework can provide a response to request B directly from a local storage—such as a data cache—instead of from the service provider application data storage. This can occur without having to delegate request B to the provider application and without the provider application having to calculate the response when request B is received from the client application, which can result in shorter data access and request processing times.

In a second alternate embodiment, an IDE (integrated development environment) can be provided for applications developers to model their application to define a UI model based on expected use access patterns of the client application. The model can contains data that is to be displayed on a certain screen and possible user actions that can be performed on that screen. These user actions may result in additional service requests. Out of this information a model describing possible sequences of client application requests (e.g., service calls) can be derived. A model of client application request sequences can be made available to the service provider application. A service request can therefore be processed synchronously and can trigger additional asynchronous processing of requests (as defined in the model of service call sequences) to preemptively calculate results, which the client may request in a subsequent request. This can also result in shorter request processing times.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of hardware and programmed computer components. The techniques described herein are not limited to any specific combination of hardware circuitry or software. Embodiments can also be practiced in distributed computing environments where tasks are performed by remote data processing devices or systems that are linked through one or more wire-based or wireless networks.

Figure 1:
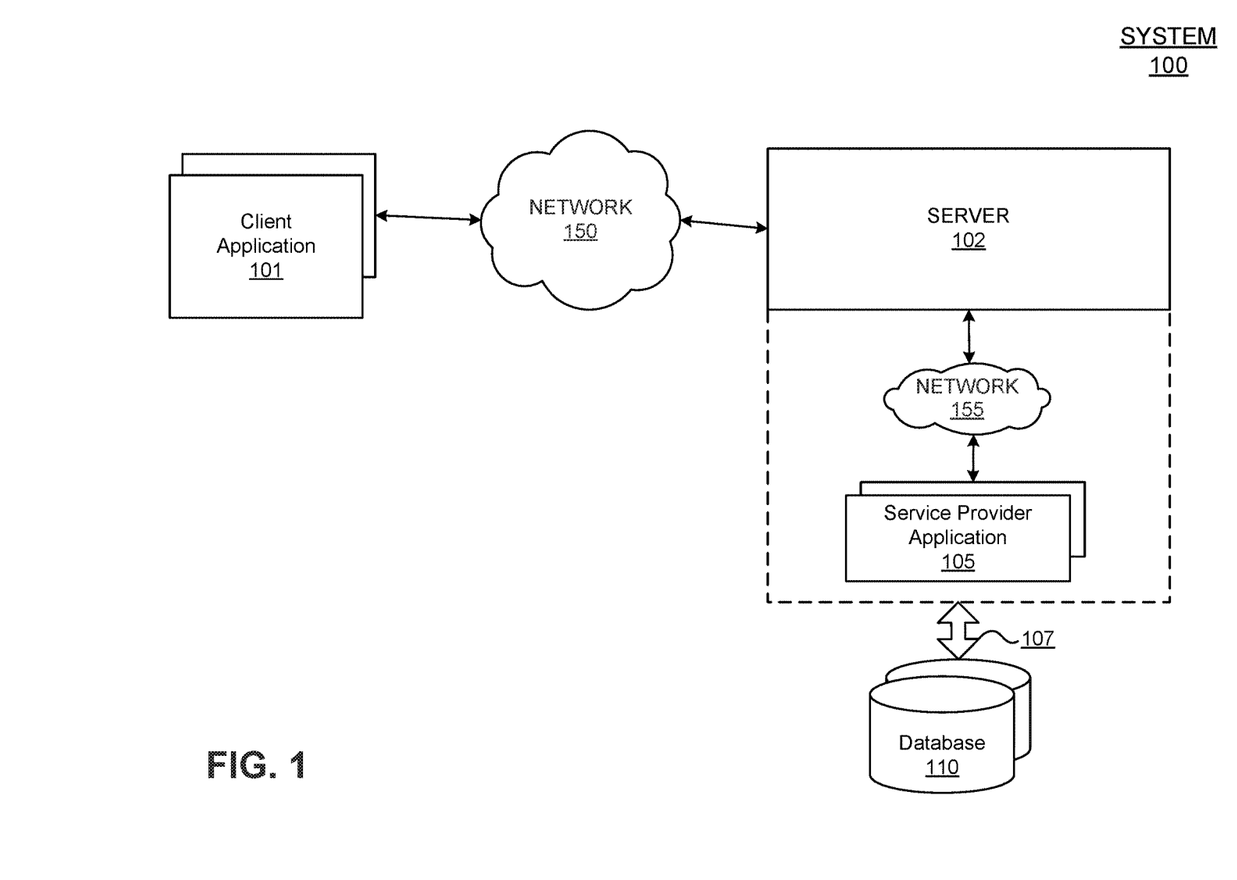
FIG. 1 depicts an example block diagram of a system comprising a client and server upon which the embodiments described herein may be implemented.

FIG. 1 depicts an example block diagram of a system comprising a client and server upon which the embodiments described herein may be implemented. In the illustrated embodiment, system 100 includes a server 102 in communication with one or more client applications 101 via one or more networks 150. The server 102 may be implemented as an individual computer hardware server, or as an array of computer hardware servers logically connected together and working in coordination to perform the functionality described herein. Generally, a data server includes a system that performs data operations with respect to data stored in one or more repositories of data. Depending on the type of data server, data operations may range from simple operations such as storing and retrieving the data, to more complex operations such as computing algorithms or calculating statistics based on the data, or arranging, modifying, or formatting the data.

Client applications 101 are in communication with the server 102 for the purpose of facilitating preemptive client application request processing based on use access patterns of the client applications 101. Client applications 101 may be mobile applications, for example, and can include one or more UIs for the user to interact with to execute the features of the application. Client applications 101 can communicate with server computer 102 via one or more communication networks 150. Client applications 101 can be configured to perform data accesses operations on data stored in database 110 by communicating data access requests/commands to the server 102 via network(s) 150. These data access requests can be triggered by a smartphone application, for example, by pressing a button, entering a search term, etc. Server 102 can be configured to receive data access requests from the client applications 101 and to provide responses over the network(s) 150.

As will be appreciated by persons of skill in the art, network(s) 150 can be implemented as a single wired or wireless network, or multiple separate networks in communication with one another. Network(s) 150 can be implemented as any wired or wireless network(s). For example, the networks described herein can be implemented as a local area network ("LAN"), wide-area network ("WAN"), combination of LANs and WANs, the Internet, or any other type of communication network adapted for exchanging electronic messages and information. Further, network(s) 150 can be implemented as a physical array of hardware resources or as a virtual array, or any combination thereof. They can also be implemented in a cloud-based network configuration. For example, network(s) 150 can be implemented as public or private cloud network, or combination thereof. No specific network or network architecture should be construed as limiting the embodiments and techniques described herein.

Server 102 is also in communication with one or more service provider applications 105 via one or more networks 155. As shown, the service provider applications 105 and networks 155 may be in remote communication with server 102, or may alternatively be components within server 102. Networks 155 can be any communication medium including an interconnect bus or any wired or wireless network as discussed above. In addition, server 102 is in communication with one or more databases 110 adapted to store service provider application data for use by the client applications 101. Server 102 may be in remote communication with the database 110 via one or more networks 107. Alternatively, database 110 may be a component of the server 102 and configured to communicate with the server 102 via an interconnect line or other direct or indirect connection or network. Database(s) 110 may be implemented as any type of database system. One example embodiment includes a relational database system, in which data is stored in structured tables comprised of rows and columns, and accessed is provided through data storage rules or schemas. Other examples of database systems include event-based systems where data can be stored in a semi-structured or unstructured format.

Figure 2:
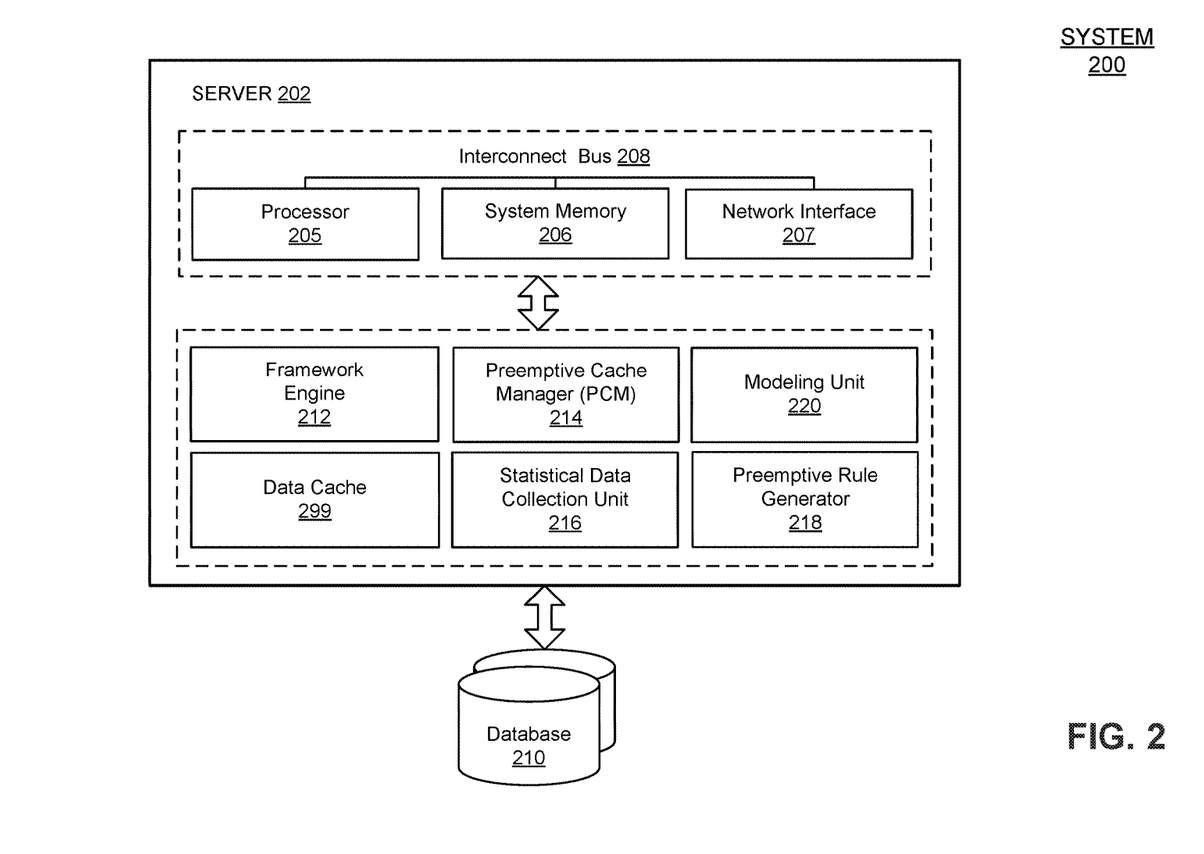
FIG. 2 depicts an example block diagram of an embodiment of a server computer for preemptive application request processing based on observed use access patterns and/or client application models.

FIG. 2 depicts an example block diagram of an embodiment of a server computer for preemptive application request processing based on observed use access patterns and/or client application models. As shown in FIG. 2, server computer 202 includes a processor 205, a system memory 206, and a network interface 207, each coupled together via an interconnect bus 208. The system memory 206 can be configured to store applications and other computer modules and processes. Client-accessible applications can also be stored in the database(s) 210 in communication with server 202 via one or more wired or wireless network connections.

In the illustrated embodiment, server 202 further includes a framework engine 212, preemptive cache manager (PCM) 214, a data cache 299, statistical data collection unit 216, preemptive rule generator 218, and a modeling unit 220. In one embodiment, the framework engine 212 comprises a data services gateway operable to expose service provider application data to client applications. The framework engine 212 is operable to receive client application requests for application data provided by one or more service provider applications, to call the appropriate service provider application(s), and to provide responses to the requests from the service provider applications. The framework engine 212 is also operable to provide the data to the client applications in a format the client application expects.

Framework engine 212 is in communication with statistical data collection unit 216. Statistical data unit 216 is operable to collect statistical data relating to the client application requests and to provide the statistical data to the preemptive rule generator 218 via one or more data storage locations (see FIG. 3). In one embodiment, the statistical data includes traces of sequences of client application service requests and provides information about which service requests to one or more service provider applications are known to follow other service requests within a threshold probability. The preemptive rule generator 218 is operable to receive the statistical data and analyze it to identify which requests have a probability of following other requests in the traces of sequences of client application requests.

When the preemptive rule generator 218 determines the probability a certain request (e.g., request A) in the traced sequences of client application requests will likely be followed by a certain other request (e.g., request B) based on the statistical data, the preemptive rule generator is operable to generate one or more preemptive rules identifying the relationship among such requests. Specifically, when the preemptive rule generator determines the probability exceeds a threshold probability (e.g., greater than 50%) that a certain request A will be followed by a certain other request B, the preemptive rule generator can generate one or more preemptive rules. The preemptive rule generator 218 can then store the preemptive rules in a data storage location to be provided to the PCM 214.

Figure 3:
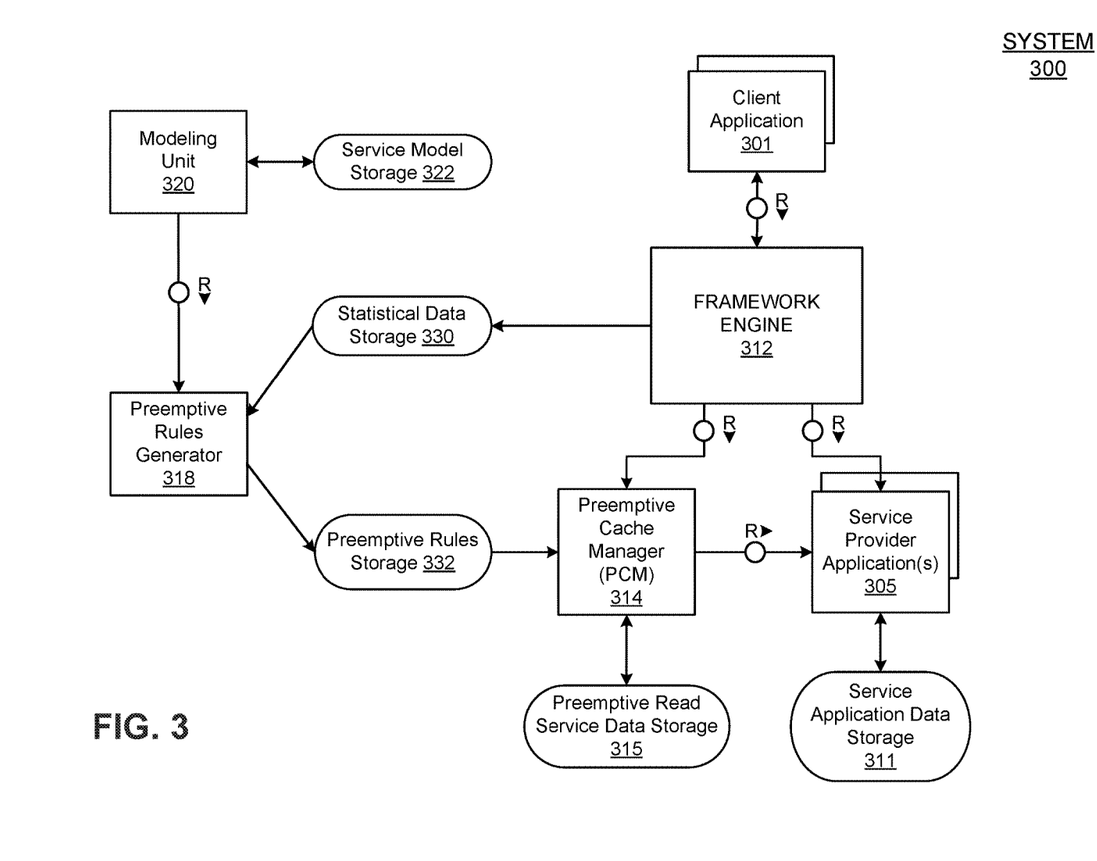
FIG. 3 depicts an example block diagram of an embodiment of a system for preemptive application request processing based on observed use access patterns and/or client application models.

The above description relates to tracing sequences of client application requests to establish a number of rules based on observed use access patterns. This can also be accomplished by generating a model of the client application request sequences and providing the model to the preemptive rules generator 218. Application developers can model the use access patterns of their respective service provider applications 105 and can provide models of call sequences to the modeling unit 220 for use in determining the sequences of requests from a particular client application 101, and for providing information based thereon to the preemptive rules generator 318 for use in establishing preemptive rules for processing client application requests.

In a well-defined communication protocol such as ODATA, for example, there is a finite number of requests that can be received from a particular client application to a service provider application. The modeling unit 220 can be used to model the client application and define a UI model based on UI metadata information that contains data that is to be displayed on a certain screen and possible user actions that can be performed on that screen. These user actions may result in additional service requests. Out of this information, a model describing possible sequences of service calls can be derived. In one embodiment, the modeling unit 220 may include an integrated development environment (IDE). The modeling unit 220 can be thought of as a pre-packaged approach that replaces the passive prediction mechanism based on observed use access patterns of the client application in the first alternate embodiment.

Using these techniques, the order or sequence of client application service requests to one or more service provider applications can be traced and used to optimize system performance. The first request A received by the framework can be processed synchronously as in conventional systems. A subsequent request B can be contemporaneously simulated asynchronously in a background process running on the system based on the observed client application use access patterns and/or the modeling of sequences of client application service requests. This information can then be used to preemptively calculate results for subsequent requests by the client application 101.

If there is a known rule, PCM 214 can trigger a simulated second request B to a particular service provider application and delegate it to a background process. Since the simulated request is expected to be the next request, the background process can retrieve the data corresponding to the simulated request from the service provider application data storage, and store it as preemptive read service data in the data cache 299 (or other local data storage location) in anticipation of receiving the second request B from the client application. In one embodiment, the framework engine 212 forwards some portion of the first request A to the PCM 214 to make the determination as to whether there is a preemptive rule associated with the request A, and then to simulate the anticipated following request B in the background process.

In one embodiment, the entire first request (e.g., URL, HTTP headers, and HTTP method) is forwarded to the PCM 214 to make a determination if the first request corresponds to any preemptive rules. For example, in the case of paging, the URL of the first request provides the starting point for the second request. The PCM 214 can execute the second request by calling the service provider application and storing the response from the service provider application in the data cache 299.

The PCM 214 is in communication with the framework engine 212 to reduce the effort required from calling backend services applications and transferring data from the backend services. This novel process can result in shorter processing times because the subsequent request B can be provided directly from the data cache 299 without having to delegate request B to the service provider application 105 at the time it is received from the client application, and without the service provider application 105 having to calculate the response when the request is received from the client application. Service provider applications can be located on a system that is different from the system comprising the framework engine 212. Any latencies encountered by making additional service calls to the various service provider applications on different systems can therefore be avoided. In addition, any delays incurred in the round trip for accessing the requested information from the data storage of the service provider applications can likewise be avoided, as well as the associated processing times.

Essentially, after the first request is received and identified as being associated with one or more preemptive processing rules, the framework engine 212 behaves as if the second request has already arrived. The PCM 214 executes the second request by calling the service provider application, and stores the response and corresponding application data in the data cache 299 (or other PCM database, etc.). For example, FIG. 3 depicts an example block diagram of an embodiment of a system for preemptive application request processing based on observed use access patterns and/or client application models. In the illustrated embodiment, system 300 includes one or more client applications 301, one or more service provider applications 305, and a framework engine 312 in between to facilitate requests from the client applications 301 and responses from the service provider applications 305. System 300 further includes a preemptive rules generator 318, a preemptive cache manager (PCM) 314, and a modeling unit 320.

Client application(s) 301 send data requests to the framework engine 312 for data to be provided from one or more service provider applications 305. The framework engine 312 is operable to collect statistical data from the client application requests and to store the statistical data in statistical data storage 330. Over time, the statistical data provided by the framework engine 312 can be used to trace sequences of client application requests and to predict which request are likely to follow other requests.

The statistical data can then be provided to the preemptive rules generator 318 where it can be analyzed to determine predicted sequences of requests. The preemptive rules generator 318 can generate one or more preemptive rules for the sequences of client application requests when it determines the probability certain requests will be followed by a certain other requests exceeds a threshold probability. In one embodiment, the threshold probability can be greater than 50%. That is, the probability a certain request will be followed by a certain other request occurs every other time or more frequently than every other time. The threshold probability is configurable and can be set to one or more values depending on the type and use access pattern of the client application 301.

The modeling unit 320 can also provide information about use access models developed as discussed above and stored in service model storage 322. These models can include statistical data and other UI metadata information that can be provided to the preemptive rules generator 318, and the preemptive rules can be generated based on this information instead of the statistical information gathered by the framework engine 312 based on observed use access patterns of the client applications 301.

The preemptive rules generator 318 stores the generated preemptive rules in storage 332 which can be accessed by the PCM 314. When a first client application 301 request A is received, the framework engine 312 is operable to check with the PCM 314 to determine if there are any preemptive rules associated with the request A. If not, the framework engine 312 repeats the process until a client application request is received that is associated with one or more preemptive rules stored in storage 332. If there are preemptive rules associated with request A, on the other hand, the PCM 314 can simulate a second request B that is predicted to follow the first request A in a background process that is executed contemporaneously with the normal processing of request A. The background process can then request and retrieve the data corresponding to the second request B from the service provider application, and the PCM 314 can then store the results in the preemptive read service data storage 315. In one embodiment, the preemptive read service data storage 315 comprises a data cache.

Accordingly, a response to request A can be provided by the appropriate service provider application(s) 305 from corresponding service application data storage 311, while a response to request B can be provided directly by the PCM 314 from the preemptive read service data storage 315 (e.g., data cache) instead of from the service provider application data storage. In one embodiment, the preemptive data storage 315 can reside on the same system as the framework engine 312 and can be configured as a data cache memory with low latency and fast response times. In other embodiments, a different kind of memory can be used.

It should be noted that the data storage locations 311, 315, 322, 330, and 332 can be implemented as any type of data storage including, but not limited to, databases, database tables, data caches, files, file systems, RAM, ROM, DRAM, flash memory, hard disk, etc. Preferably a smaller memory with lower latency and faster response times such as a data cache should be used to optimize performance gains over having to go retrieve the data from the service provider application 305.

In this manner, the sequence of client application service requests can be determined and used to predict the next requests that will be received to optimize system performance. This information can then be used to preemptively calculate results for subsequent requests by the client application 101. For example, a materials UI application might start by showing an initial list of materials. The UI application may only request a few materials in the list at first (e.g., the first 20 materials) from a materials service provider application. The UI application can be configured to only show a few fields (e.g., material name, number, etc.) in the list. Hence, the UI application may only request a few fields corresponding to the first 20 materials from the service.

In OData this request may look like the following:
OData: . . . ServiceName/Materials?$top=20& $skip=0 & $select=MaterialName, Material Number, . . . .

If the user wants to see more materials (e.g., by paging or scrolling through the list) the next set of materials can be requested from the service as follows:
OData: . . . SeriveName/Materials?$top=20& $skip=20& $select=MaterialName, Material Number, . . .

If the user wants to see the details for a particular material in the list (e.g., additional fields for one of the materials), the corresponding additional information for the material can be requested from the service as follows:
OData: . . . ServiceName/Materials(MaterialNumber= . . . ).

As another example, for related entities in a business application such as business partners, contacts, and related products or services, the sequence of requests can include (1) a request for the service, (2) certain tokens for security authentication, (3) a particular UI page/screen, (4) the top-level business object (e.g., business partner), and then (5) the related business objects such a contacts and related products or services. As soon as the client application requests the service, the system can predict the client will request the other information. This information can be simulated and processed in a background process asynchronously to optimize system response time performance.

II. Exemplary Processes

Figure 4A:
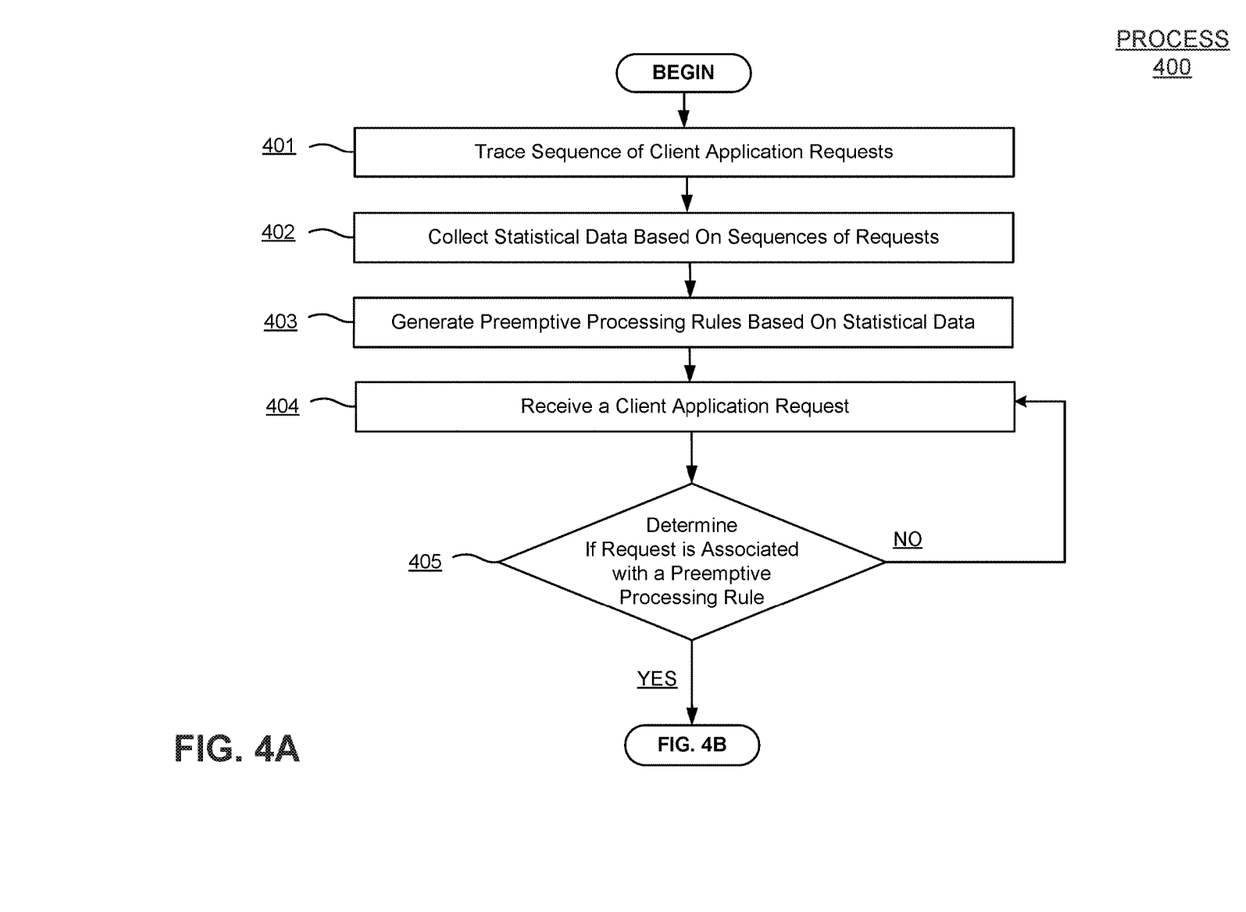
FIGS. 4A-4B depict a flow chart of an example embodiment of a method for performing preemptive client application request processing according to the techniques described herein.
Figure 4B:
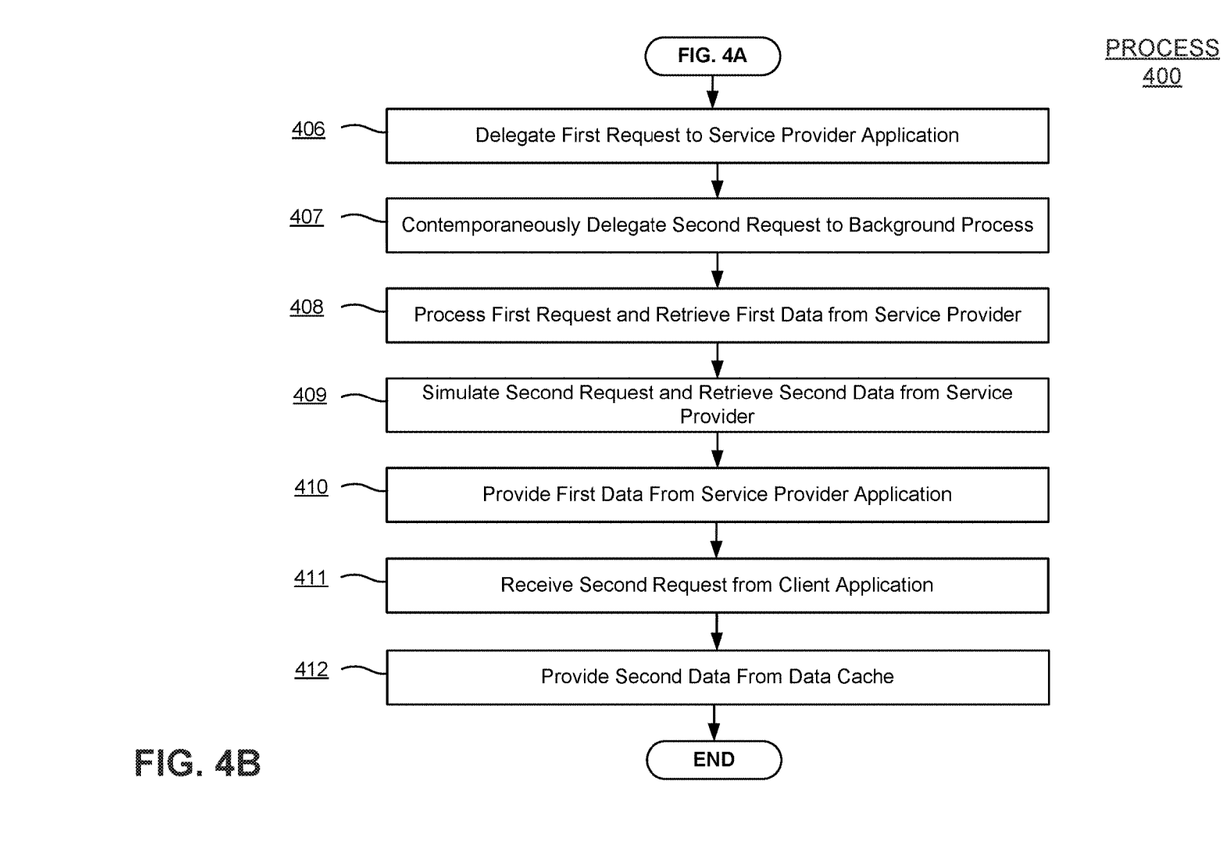

FIGS. 4A-4B depict flow charts of example embodiments of a method for preemptive processing of client application requests in a communication network. It is noted that the processes described below are exemplary in nature and are provided for illustrative purposes and not intended to limit the scope of the invention to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

The embodiments described herein include techniques for preemptive application request processing based on observed use access patterns and/or application models. In the illustrated embodiment of FIG. 4A, process 400 begins by tracing sequences of client application requests for application data from one or more service provider applications (via a framework engine) to identify which client requests have a probability above a threshold probability of following other client requests (operation 401). Process 400 continues by collecting statistical data based on the sequences of client application requests received at the framework engine (operation 402) and generating preemptive processing rules based on the statistical data (operation 403). The preemptive processing rules can be generated by the preemptive rules generator as discussed above.

When a first request is received from the client application for first application data of the service provider application (operation 404), a preemptive cache manager checks the preemptive rules database (or other data storage configuration) to determine if the first request is associated with one or more preemptive rules (operation 405). If not, process 400 repeats until a client application request is received that corresponds to a preemptive rule. If there is a preemptive rule, process 400 continues at operation 406 in FIG. 4B.

In the illustrated embodiment of FIG. 4B, process 400 continues by simulating a second request that is predicted to follow the first request in a background process executed contemporaneously with the normal processing of the first request, and storing the results in a data storage that is local to the framework such as a data cache or local database. Specifically, the first request is delegated to the appropriate service provider application (operation 406) and the second anticipated request is contemporaneously delegated to a separate background process (operation 407). The first request is processed normally and first data corresponding to the first request is retrieved from the service provider application (operation 408).

At operation 409, the background process simulates the second anticipated request and retrieves the second data corresponding to the second request from the service provider application. The second data of the second request can then be stored in a local data storage for faster access if the second request is received from the client application.

The first data of the first response to the first request can then be provided from the service provider application (e.g., via the framework engine) to the requesting client application (operation 410). And if the second request is received (operation 411), the second response comprising the second data can be provided directly from the data storage (e.g., data cache) located on the same system as the framework engine instead of from the service provider application data storage (operation 412). In one embodiment, the data cache is coupled with a preemptive cache manager as discussed above, which is configured to provide the framework engine with faster access to responses to the client application requests. The second response can be provided from the data cache without having to delegate the second request to the service provider application after the second request is received from the client application.

As discussed above, in one embodiment, the statistical data is based upon observed use access patterns of the client application. In an alternate embodiment, the statistical data can be based on a use access model developed for the client application. This completes process 400 according to one example embodiment.

III. Exemplary Hardware Implementation

Embodiments of the present invention may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 5:
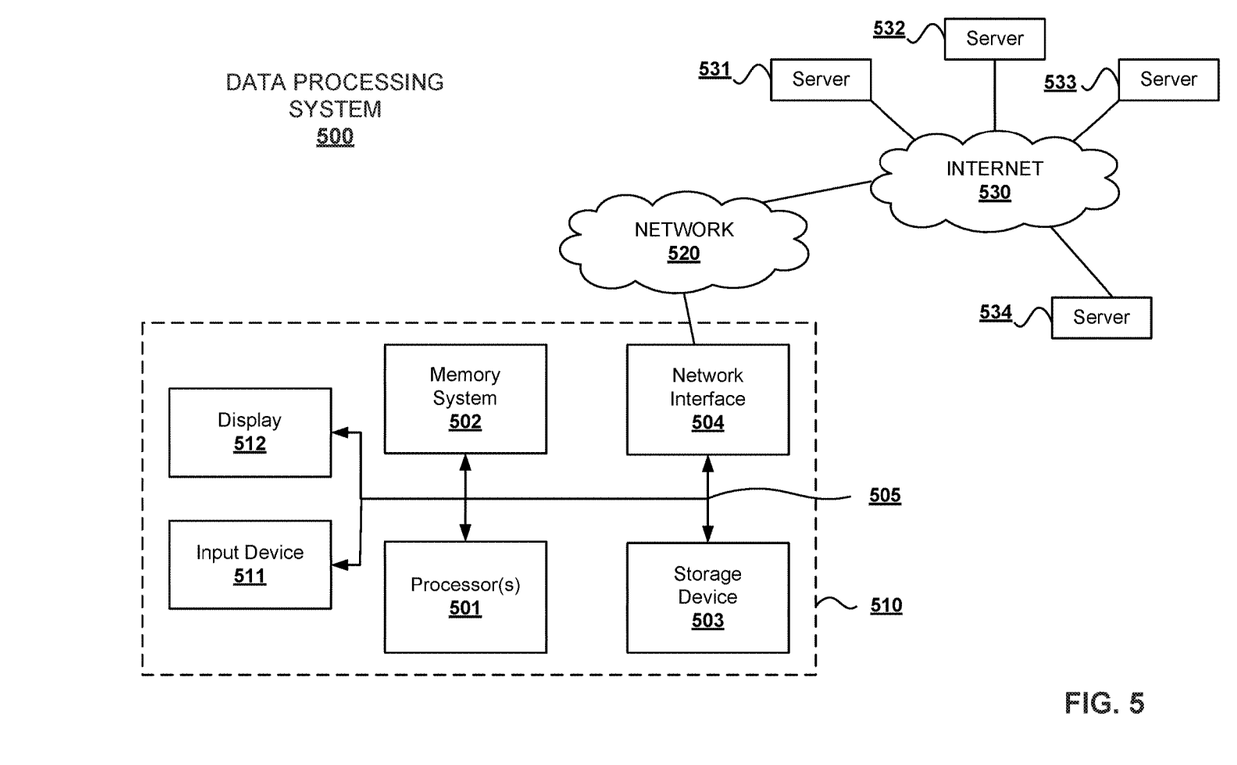
FIG. 5 depicts an example overview block diagram of a data processing system upon which the embodiments described herein may be implemented.

FIG. 5 depicts an example overview block diagram of a data processing system upon which the embodiments described herein may be implemented. The following hardware description is merely one example. It is to be understood that a variety of computers configurations may be used to implement the described techniques. While FIG. 5 illustrates various components of a data processing system 500, it is not intended to represent any particular architecture or manner of interconnecting components. It will also be appreciated that network computers and other data processing systems, which have fewer components or additional components, may be used. The data processing system 500 may, for example, comprise a personal computer (PC), workstation, laptop computer, tablet, smartphone or other hand-held wireless device, or any device having similar functionality.

In the illustrated embodiment, data processing system 500 includes a computer system 510. Computer system 510 includes an interconnect bus 505 (or other communication mechanism for communicating information) and one or more processor(s) 501 coupled with the interconnect bus 505 for processing information. Computer system 510 also includes a memory system 502 coupled with the one or more processors 501 via the interconnect bus 505. Memory system 502 is configured to store information and instructions to be executed by processor 501, including information and instructions for performing the techniques described above. This memory system may also be used for storing programs executed by processor(s) 501. Possible implementations of this memory system may be, but are not limited to, random access memory (RAM), read only memory (ROM), or combination thereof.

In the illustrated embodiment, a storage device 503 is also provided for storing information and instructions. Typically storage device 503 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 503 may store source code, binary code, or software files for performing the techniques above. In addition, while FIG. 5 shows that storage device 503 as a local device connected with the components of the data processing system, it will be appreciated by skilled artisans that the described techniques may use a storage device remote from the system, such as a database or other network storage device coupled with the computer system 510 through a network interface such as network interface 504.

Network interface 504 may provide communications between computer system 510 and a network 520. The network interface 504 may be a wireless or wired connection, or any combination thereof. Computer system 510 is configured to send and receive information through the network interface 504 across one or more networks 520 such as a local area network (LAN), wide-area network (WAN), wireless or Bluetooth network, or the Internet 530, etc. Computer system 510 may access data and features on systems residing on one or multiple different hardware servers 531-534 across the network 520. Hardware servers 531-534 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 510 may be coupled via interconnect bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the invention. It will be apparent, however, to persons skilled in the art that these embodiments may be practiced without some of these specific details. The above examples and embodiments should not be deemed to be the only embodiments, and are presented to illustrate the flexibility and advantages of the present invention. Other arrangements, embodiments, implementations and equivalents will be evident to those skilled in the art and may be employed without departing from the spirit and scope of the invention as defined by the following claims.

What is claimed is:

1. A method for processing client application requests in a communication network comprising:
    tracing sequences of client application requests for data from service provider applications to identify which requests have a probability above a threshold probability of following other requests;
    collecting statistical data based on the sequences of client application requests;
    generating one or more preemptive processing rules based on the statistical data, wherein different preemptive processing rules correspond to different sequences of client application requests;
    receiving a first request from the client application for first application data of the service provider application; and
    determining whether the first request is associated with one or more of the preemptive processing rules, and if so:
        delegating the first request to the service provider application and contemporaneously delegating to a background process a second request that is predicted to follow the first request;
        providing a first response to the first request comprising the first application data from the service provider application;
        retrieving second application data for the second request from the service provider application in anticipation of receiving the second request from the client application;
        receiving the second request from the client application for the second application data; and
        providing a second response to the second request comprising the second application data from local data storage instead of from the service provider application.

2. The method of claim 1 wherein the local data storage comprises a data cache.

3. The method of claim 1 wherein the second response is provided from the local data storage without having to delegate the second request from the client application to the service provider application.

4. The method of claim 1 wherein the statistical data is collected from the client application requests and is based upon observed use access patterns of the client application.

5. The method of claim 1 wherein the statistical data is based on a use access model for the client application.

6. The method of claim 1 further comprising analyzing the statistical data to determine which requests have a probability above a threshold probability of following other requests.

7. The method of claim 1 wherein the threshold probability is configurable.

8. The method of claim 1 wherein the application data is accessed based on a well-defined network communication protocol.

9. The method of claim 1 further comprising maintaining security by authenticating the client application and running the background process in a context of the client application.

10. A non-transitory computer readable storage medium tangibly embodying computer code, which when executed by a computer system, causes the computer system to perform operations for processing client application requests in a communication network, the operations comprising:
    tracing sequences of client application requests for data from service provider applications to identify which requests have a probability above a threshold probability of following other requests;
    collecting statistical data based on the sequences of client application requests;
    generating one or more preemptive processing rules based on the statistical data, wherein different preemptive processing rules correspond to different sequences of client application requests;
    receiving a first request from the client application for first application data of the service provider application; and
    determining whether the first request is associated with one or more of the preemptive processing rules, and if so:
        delegating the first request to the service provider application and contemporaneously delegating to a background process a second request that is predicted to follow the first request;
        providing a first response to the first request comprising the first application data from the service provider application;
        retrieving second application data for the second request from the service provider application in anticipation of receiving the second request from the client application;
        receiving the second request from the client application for second application data of the service provider application; and
        providing a second response to the second request comprising the second application data from a local data storage instead of from the service provider application.

11. The computer readable medium of claim 10 wherein the local data storage comprises a data cache.

12. The computer readable medium of claim 10 wherein the second response is provided from the data cache without having to delegate the second request from the client application to the service provider application.

13. The computer readable medium of claim 10 wherein the statistical data is based upon observed use access patterns of the client application.

14. The computer readable medium of claim 10 wherein the statistical data is based on a use access model for the client application.

15. The computer readable medium of claim 10 further comprising maintaining security by authenticating the client application and running the background process in a context of the client application.

* * * * *